(12) United States Patent
Khan et al.

(10) Patent No.: US 11,321,655 B2
(45) Date of Patent: May 3, 2022

(54) FRICTIONLESS AND AUTONOMOUS CONTROL PROCESSING

(71) Applicant: NCR Corporation, Atlanta, GA (US)

(72) Inventors: Sudip Rahman Khan, Decatur, GA (US); Matthew Robert Burris, Atlanta, GA (US); Christopher John Costello, Suwanee, GA (US); Gregory Joseph Hartl, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 6 days.

(21) Appl. No.: 16/696,870

(22) Filed: Nov. 26, 2019

(65) Prior Publication Data

US 2021/0158240 A1 May 27, 2021

(51) Int. Cl.
*G06Q 10/06* (2012.01)

(52) U.S. Cl.
CPC .............................. *G06Q 10/0639* (2013.01)

(58) Field of Classification Search
None
See application file for complete search history.

(56) References Cited

U.S. PATENT DOCUMENTS

| 10,217,120 B1* | 2/2019 | Shin ................. G06Q 10/06393 |
| 2009/0083122 A1 | 3/2009 | Angell et al. |
| 2013/0030875 A1 | 3/2013 | Lee et al. |
| 2013/0070056 A1 | 3/2013 | Tripathi |
| 2014/0098235 A1* | 4/2014 | Cusack, Jr. .............. G07C 9/27 348/156 |
| 2017/0286901 A1* | 10/2017 | Skaff ....................... G06N 3/008 |
| 2018/0005176 A1* | 1/2018 | Williams ............. G06K 9/3233 |
| 2018/0176727 A1* | 6/2018 | Williams ............... A61B 5/747 |
| 2019/0354753 A1* | 11/2019 | Worrall ............. G06K 9/00087 |
| 2020/0013684 A1* | 1/2020 | Soss .................... H01L 29/0847 |

OTHER PUBLICATIONS

Marra et al., "Clinical Microbiology and Infection", vol. 20, Issue 1, Jan. 2014, pp. 29-33 (Year: 2014).*
Lynch, Google'S. "Future of Law Enforcement (2017)." Criminal Justice 35.2 (2020). (Year: 2017).*
Mazumdar, Suvodeep, et al. "Geo-fence driven crowd-sourcing for Emergencies." ISCRAM. 2015. (Year: 2015).*

* cited by examiner

*Primary Examiner* — Thomas L Mansfield
(74) *Attorney, Agent, or Firm* — Schwegman, Lundberg & Woessner (57) ABSTRACT

Individuals are monitored for actions and behaviors of the individuals during performance of establishment processes through video feeds captured by cameras. Transaction information associated with transactions being processed by a transaction system of the establishment are monitored. The actions, behaviors, transaction information, and establishment processes are correlated to process controls of the establishment and logged in an audit log. Non-compliant actions, behaviors, or transaction information with respect to the process controls generate real-time alerts, real-time assistance for compliance by any offending individual, and/or remedial training for compliance of the offending individual.

7 Claims, 4 Drawing Sheets

FRICTIONLESS AND AUTONOMOUS CONTROL PROCESSING

BACKGROUND

Enterprises have a variety of controls that are required during performance of business processes and tasks. Some are specific to a given enterprise and some are government regulated and specific to a type of enterprise. For example, bank branches must follow a myriad of processes and procedures to ensure federal and internal company standards are being followed and to minimize risk exposure of the branches.

Among other things, processes and procedures require the monitoring of staff and money movements using logs maintained online and offsite. The processes and procedures also require that the bank provide onsite training to ensure that staff are adequately equipped to follow the proper protocols of the bank with respect to compliance associated with the maintaining the logs. Still further, staff must know how to remediate any violations that are known to occur within the bank. The processes and procedures are periodically revised by both the banks and the federal government that regulates the bank processes and procedures.

As long as humans/staff are involved in a process, training, monitoring, auditing, and retraining will be necessary and required. Banks invest substantial amounts of money and time, maintaining processes, tracking processes, auditing processes, and training staff on the processes. Human error is a frequently occurring problem, which results in problematic auditing or dubious auditing results.

SUMMARY

In various embodiments, methods and a system for frictionless and autonomous control processing are presented.

According to an embodiment, a method for frictionless and autonomous control processing is presented. A transaction or a process is identified, the transaction of the process is initiated within an establishment. A process control is obtained, the process control is associated with the transaction of the process. Performance of the transaction or process is monitored, through at least video feeds, in accordance with the process control. Performance data for the transaction or the process is logged, and a notification is sent when at least a portion of the performance data violates the process control.

DETAILED DESCRIPTION

Figure 1:
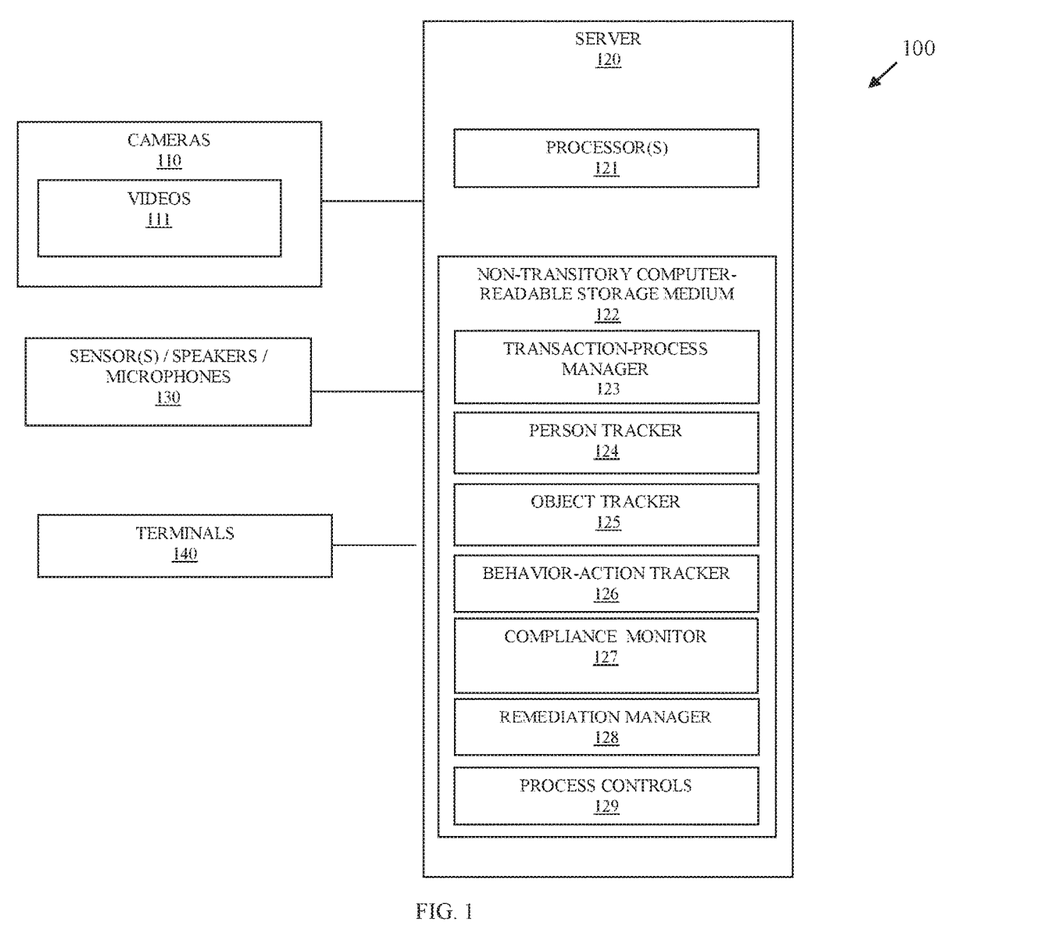
FIG. 1 is a diagram of a system for frictionless and autonomous control processing, according to an example embodiment.

FIG. 1 is a diagram of a system 100 for frictionless and autonomous control processing according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of frictionless and autonomous control processing, presented herein and below.

System 100 is a full autonomous process monitoring and remediation system that utilizes transaction-based data and computer vision to monitor transaction and processes occurring within an establishment for compliance and remediation. System 100 also provides metrics regarding transactions and performed processes for purposes of discovering and improving existing establishment's processes.

As used herein and below, the terms "user," "personnel," "actor," "person," "individual," and "subject" may be used interchangeably and synonymously. The terms refer to an individual detected within a secure area or a monitored area where one or more secure assets are present.

The phrases "security procedures," "security policies," and "process controls" may be used synonymously and interchangeably herein and below. These phrases comprise, inter alia, government-required or establishment required business rules associated with a business process of the establishment.

A "business process," as used herein, refers to a set of activities or actions required in performance of a predefined task of the establishment.

An "object" refers to a secure asset or structure located within the establishment. The object may include drawers, computers, keys, cash, checks, tables, security panels, chairs, windows, notary stamps, doors, documents, terminals, countertops, shelving, items being sold within the establishment, etc. that are being monitored within the image frames of one or more videos provided in video feeds.

System 100 includes a plurality of cameras 110 that capture time-stamped videos of persons and objects outside and on a premise of an establishment and within the establishment. System 100 includes terminals used to process transactions associated with the establishment. Moreover, system 100 also includes server 120. Server 120 includes executable instructions that execute on one or more hardware processors 121 of server 120 from a non-transitory computer-readable storage medium 122 as: transaction process manager 123, person tracker 124, object tracker 125, behavior-action tracker 126, compliance monitor 127, and remediation manager 128. Non-transitory computer-readable-storage medium 122 also includes process controls 129 (security policies 129).

Process controls 129 represent a data structure comprising and embodying business rules associated with a predefined business process or task of an establishment. Process controls 129 include statements of area identifiers, asset/object identifiers, action identifiers, behavior identifiers, security role identifiers for security roles and responsibilities, transaction data identifiers for types of transaction data required for any given task, task identifiers that identify specific tasks, and conditions that defines rules. Each rule identifying a task and required actions, behaviors, and transaction information for that task. Tasks can be required or can be defined as impermissible. The sequence of the tasks may also be defined within the conditions for the rules. Each rule may also include a resource identifier or a processing action that is to be processed when a given rule is violated. The resource associated with the resource identifier may be an automated application, a system, or an electronic contact address of an individual.

It is to be noted that there may be multiple servers 120, such that the different elements 123-128 may execute on a same server 120 or multiple different servers 120 networked together.

Cameras 110 are preconfigured to capture videos 111 of areas that are inside and outside the establishment based on the field-of-view of the lenses of cameras 110. Some of cameras 110 may capture images 111 representing portions of a different area than a different one of the cameras 110 captures video 111 for. That is, each video 111 can include frames that may overlap multiple ones of the defined areas.

In an embodiment, the cameras 110 can be situated at different angles and heights within the areas where they are located. Some cameras 110 may be at waist level, chest level, or head level to an average sized person and directed in different directions upward or downward slightly for purposes of capturing the eyes of individuals within the room. Additionally, there may be one or more overhead cameras 110 both inside and outside the establishment. Some cameras 110 may be specifically calibrated to capture eyes and faces of the individuals.

Initially, cameras 110 are situated in locations throughout the establishment and one or more cameras 110 may situated on the outside of the establishment to capture the egress and ingress point of the establishment and optionally to capture a parking lot associated with the establishment Each camera lens configured to cover one or more predefined areas both inside and outside the establishment.

Furthermore, metadata is assigned to each camera 110 to include a unique camera identifier, a location identifier (representing the physical location that camera 110 is situated), and one or more area identifiers (representing the predefined areas that the lens of camera 110 captures in the video 111).

Terminals 140 comprising processing devices that are operated by employees or customers of the establishment during transactions. Transactions may comprise processing actions initiated by the employees in performance of a portion of a task associated with the establishment.

Transaction process manager 123 receives transaction identifiers from terminals 140 as well as operation identifiers for operations being performed and parameter data supplied as input to the operations by the employees or customers during transactions at terminals 140.

Transaction process manager 123 supplies transaction identifiers, operation identifiers, and parameter data as transaction information to compliance monitor 127 in real time as transactions are being processed on terminals 140.

Once device manager 123 determines the both devices 140 are within the geofenced area, device manager 123 sends a notification to initiate opening security procedures for the establishment to security-procedure enforcer 127 along with mobile device identifiers for the mobile devices 140. It is to be noted that security-procedure enforcer 127 may have access to the schedule and device identifiers for the employees, such that the device identifiers do not have to be included with the notification sent by device manager 123.

Person tracker 124 analyzes pixels in video frames of video feeds 111 and uses a bounding box or region of interest within the pixels to track locations of the individuals and extremities (arms, hands) of the individuals within a known area of the establishment based on the area identifiers associated with cameras 110.

Object tracker 125 monitors the structures and assets within the establishment via bounding boxes or regions of interest within pixels of the image frames for the video feeds 111.

Behavior-action tracker 127 utilizes the bounding boxes associated with each individual and the objects to perform more detailed pixel analysis on facial features of the individuals and identify behaviors identified by specific behavior identifiers. Moreover, location information within the pixels for the bounding boxes of the individuals and the objects are used by behavior-action tracker 127 to identify actions that corresponding to action identifiers.

Compliance monitor 127 utilizes transaction information supplied by terminals 140 and location information of the bounding boxes for the each individual within the establishment against known locations within the establishment with the object identifiers provided by object tracker 125, action identifiers provided by behavior-action tracker 126, and behavior identifiers provided by tracker 126 to evaluate process controls 129 and determine that actions, behaviors, and transaction information are being performed and processed in the correct order and with the correct types of data as defined in controls 129.

The compliance monitor 127 plugs in the identifiers into the controls 129 and evaluates the conditions to determine whether a given task associated with a given establishment process is being completed correctly or incorrectly. Controls 129 provide processing actions that are to be taken by compliance monitor 127 when a given task is associated with a correct set of actions, behaviors, operations, and data, in a correct sequence, and controls 129 provide other processing actions that are to be taken by compliance monitor 127 when a given task includes incorrect or impermissible actions, behaviors, operations, and data in an incorrect sequence.

Manager 123 and trackers 124-126 provides identifiers and location information for both a given transaction one or more individuals from video feeds 111, and objects, and compliance monitor 127 determines from controls 129 when a given establishment task was or is being completed correctly or incorrectly in accordance with procedures defined within rules of controls 129.

Compliance monitor 127 may also time and date stamp entries along with individual identifiers identified for the individuals from video feed 111, action identifiers, behavior identifiers, transaction identifiers, transaction operation identifiers, transaction parameter data, and task identifiers associated with rules of the controls 129 in a security log.

Compliance monitor 127 is configured to look for predefined transaction types associated with transaction information supplied by terminals 140 and/or predefined action identifiers supplied by behavior-action tracker 126. The transaction type and/or action identifier is used by compliance monitor 127 to obtain specific controls 129. The specific controls are then evaluated in the manners discussed above by compliance monitor 127.

Some non-compliant actions, non-compliant behaviors, and non-compliant transaction information may be identified in the corresponding controls 129 to cause compliance monitor 128 to initiate and engage remediation manager 128. Remediation manager 128 may based on the task identifier and the non-compliant identifiers take a variety of processing actions, such as and byway of example only, 1) engage an individual conducting a transaction or a task in a natural-language voice dialogue, 2) schedule a remediation training from an offending individual associated with the non-compliant actions, non-compliant behaviors, or non-compliant transaction information; 3) send assistance information to a device associated with the offending individual for correctly performing the tasks; and/or 4) generate a video clip from video feed 111 that corresponds to the non-compliant actions, the non-compliant behaviors, or non-compliant transaction information and send the video clip to the offending individual and/or a supervisor of the offending individual.

Remediation manager 128 may engage in any natural-language dialogue with the offending individual using a speaker and a microphone integrated into terminal 140, a user-operated mobile device, and/or network-based microphones and speakers 130 situated throughout the establishment. Additionally, the natural language dialogue may be conducted using a network-based appliance that is part of the Internet-of-Things (IoTs) and that is equipped with both a microphone and a speaker.

Remediation manager 128 may interface with a scheduling and training system associated with the establishment for purposes of scheduling remediation training.

In an embodiment, a given task may be defined within controls 129 based on roles assigned to multiple individuals and actions required by each individual with respect to that individual's defined role. In such embodiment, compliance monitor 127 is further enabled to assign role identifiers for the multiple individuals based on individual identifiers determined by person tracker 124 and/or behavior-action tracker 126.

In an embodiment, compliance monitor 127 is further configured to raise an alert based on a given processing action within controls 129. The alert can be sent to a security system and/or to one or more predefined individuals. Compliance monitor 127 may also stream the video feed 111 associated with any non-compliance to a security monitor for real-time viewing in connection with the alert.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame of each video feed 111 includes its metadata (minimally including what was discussed above) with its video frame on the server 120.

One now appreciates how system 100 can be used as a real-time frictionless (no user action is required) autonomous security monitoring mechanism that monitors, tracks, and remediates an establishments business process security and audit procedures. Individuals of the establishments are not required to make entries in any security log; although in some cases this may still be required to cross check frictionless security compliance monitor system 100. Moreover, non-compliant actions, behaviors, and transaction information may cause alarms of different levels of severity as defined in controls 129. Threats are automatically identified, and a security system is alerted to dispatch authorities when needed.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries. For example, facial recognition may ensure that the individuals are the expected authorized employees performing the audit tasks or procedures of the establishment.

It is noted that other biometric features may be used as well, such as and my way of example only, a fingerprint provided by a security system indicating that the individual was authenticated for performing a given task, a retina scan, a digit distance and length measurement, a palm reader, a voice print (captured by a microphone 130), etc. Additionally, features from the video feeds 111 do not have to only include facial features and can include any combination of features or a single set of features associated with the individuals: gait, extremity length, height, and/or facial features.

In an embodiment, compliance monitor 127 listens for keywords spoken an individual captured from microphones 130. When a keyword associated with distress is spoken, compliance monitor 127 raises a silent alarm and may notify one or more other individuals associated with the establishment.

Compliance monitor 127 may utilize a variety of sensors 130 after individuals have left or entered different rooms of the establishment after completion of a given auditable task. Compliance monitor 127 may also utilizes sensors 130 to check that doors to rooms or drawers are in an appropriate state of unlocked or locked.

In an embodiment, compliance monitor 127 maintains metrics associated with employees performing tasks (including transactions), such as time associated with a given task as a whole, time associated with a given action of a task, time associated with a given set of actions of a task, etc. Compliance monitor may then provide an interface for searching, reporting, and mining the metrics. This can be used for continuous process improvements associated with the tasks, non-reputable evidence of non-compliance infractions associated with a given employee, and/or for employee evaluation and discipline.

In an embodiment, components of system 100 may include one or more trained-machine learning algorithms to assist in the tracking and monitoring of actions and behaviors or the individuals engaged in auditable tasks of the establishment.

The above-noted embodiments and other embodiments are now discussed with reference to FIGS. 2-4.

Figure 2:
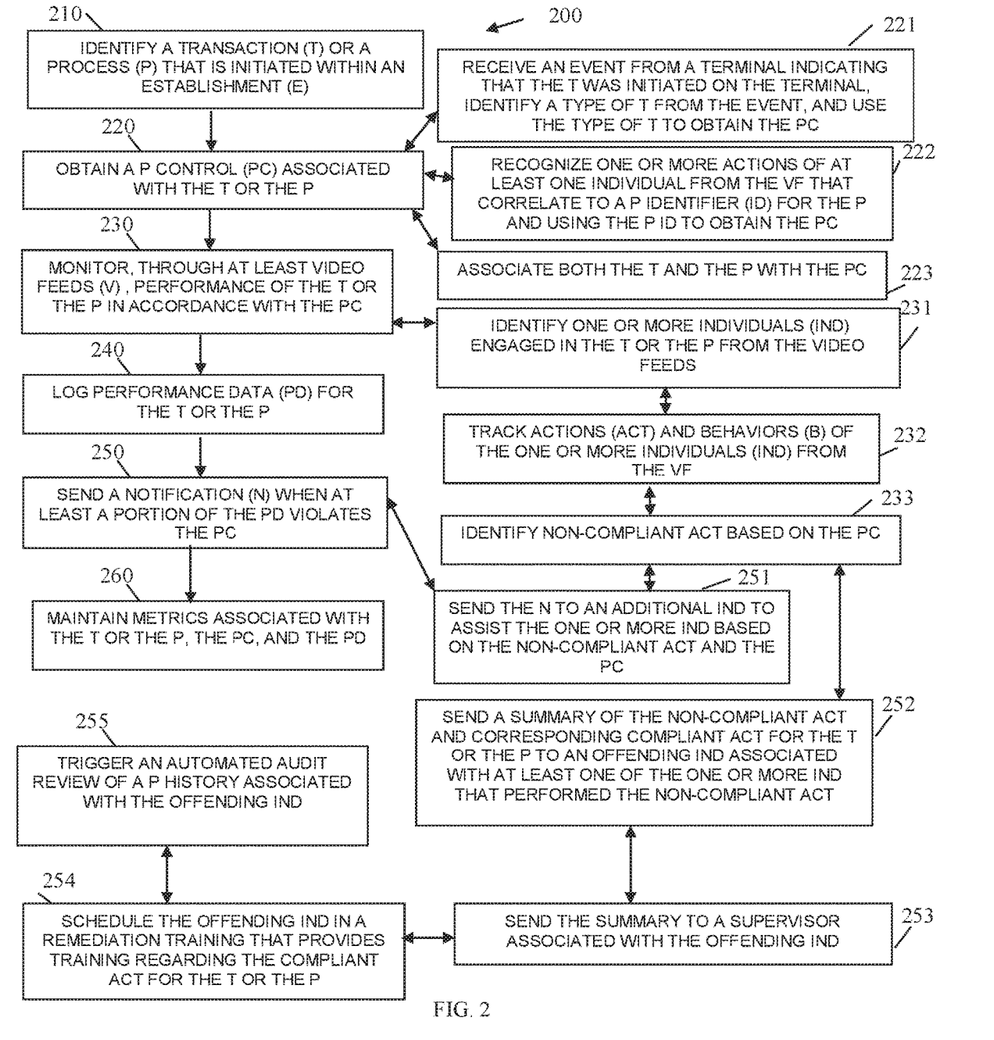
FIG. 2 is a diagram of a method frictionless and autonomous control processing, according to an example embodiment.

FIG. 2 is a diagram of a method 200 frictionless and autonomous control processing, according to an example embodiment. The software module(s) that implements the method 200 is referred to as a "frictionless compliance manager." The frictionless compliance manager is implemented as executable instructions programmed and residing within memory and/or a non-transitory computer-readable (processor-readable) storage medium and executed by one or more processors of a device. The processor(s) of the device that executes the frictionless compliance manager are specifically configured and programmed to process the frictionless compliance manager. The frictionless compliance manager may have access to one or more network connections during its processing. The network connections can be wired, wireless, or a combination of wired and wireless.

In an embodiment, the device that executes the frictionless compliance manager is server 120. In an embodiment, server 120 is a cloud-based server, a local-area network (LAN)-based server, or a wide-area network (WAN) server.

In an embodiment, the frictionless compliance manager is all or some combination of: person tracker 124, object tracker 125, behavior-action tracker 126, compliance monitor 127, and/or remediation manager.

At 210, the frictionless compliance manager identifies a transaction or a process that is initiated within an establishment. Initiation may be received as an event raised by a security system within the establishment or an event raised by a transaction system. Additionally, initiating may be detected based on video analysis of actions that mapped to the process.

At 220, the frictionless compliance manager obtains a process control associated with the transaction or the process. The process control is the process control 129 discussed above with the FIG. 1.

In an embodiment, at 221, the frictionless compliance manager receives an even from a terminal indicating that the transaction was initiated on the terminal. The frictionless compliance manager identifies the type of transaction associated with the transaction from the event and uses the type of transaction to obtain the appropriate process control.

In an embodiment, at 222, the frictionless compliance manager recognizes one or more actions of at least one individual from video feeds that correlate to a process identifier for the process and uses the process identifier to obtain the appropriate process control.

In an embodiment, at 223, the frictionless compliance manager associates both the transaction and the process with the process control.

At 230, the frictionless compliance manager monitors, through the video feeds performance of the transaction or the process in accordance with the process control.

In an embodiment, at 231, the frictionless compliance manager identifies one or more individuals engaged in the transaction or the process from the video feeds. That is, each individual is uniquely assigned an establishment identity associated with that individual.

In an embodiment of 231 and at 232, the frictionless compliance manager tracks actions and behaviors of the one or more individuals from the video feeds.

In an embodiment of 232 and at 233, the frictionless compliance manager identifies non-compliant actions based on the process control.

At 240, the frictionless compliance manager logs performance data associated with performing the transaction or the process in a security audit log.

At 250, the frictionless compliance manager sends a notification when at least a portion of the performance data violates the process control.

In an embodiment of 233 and 250, at 251, the frictionless compliance manager sends the notification to an additional individual to assist one or more of the individuals based on the non-compliant actions and the process control.

In an embodiment of 233 and 250, at 252, the frictionless compliance manager sends a summary of the non-compliant actions and corresponding compliant actions expected for the transaction or the process to an offending individual associated with at least one of the one or more individuals that performed the non-compliant actions.

In an embodiment of 252 and at 253, the frictionless compliance manager sends the summary to a supervisor associated with the offending individual.

In an embodiment of 253 and at 254, the frictionless compliance manager schedules the offending individual in a remediation training that provides training regarding the compliant actions for the transaction or the process.

In an embodiment of 254 and at 255, the frictionless compliance manager triggers an automated audit review of a process history associated with the offending individual.

In an embodiment, at 260, the frictionless compliance manager maintains metrics associated with the transaction or the process, the process control, and the performance data.

Figure 3:
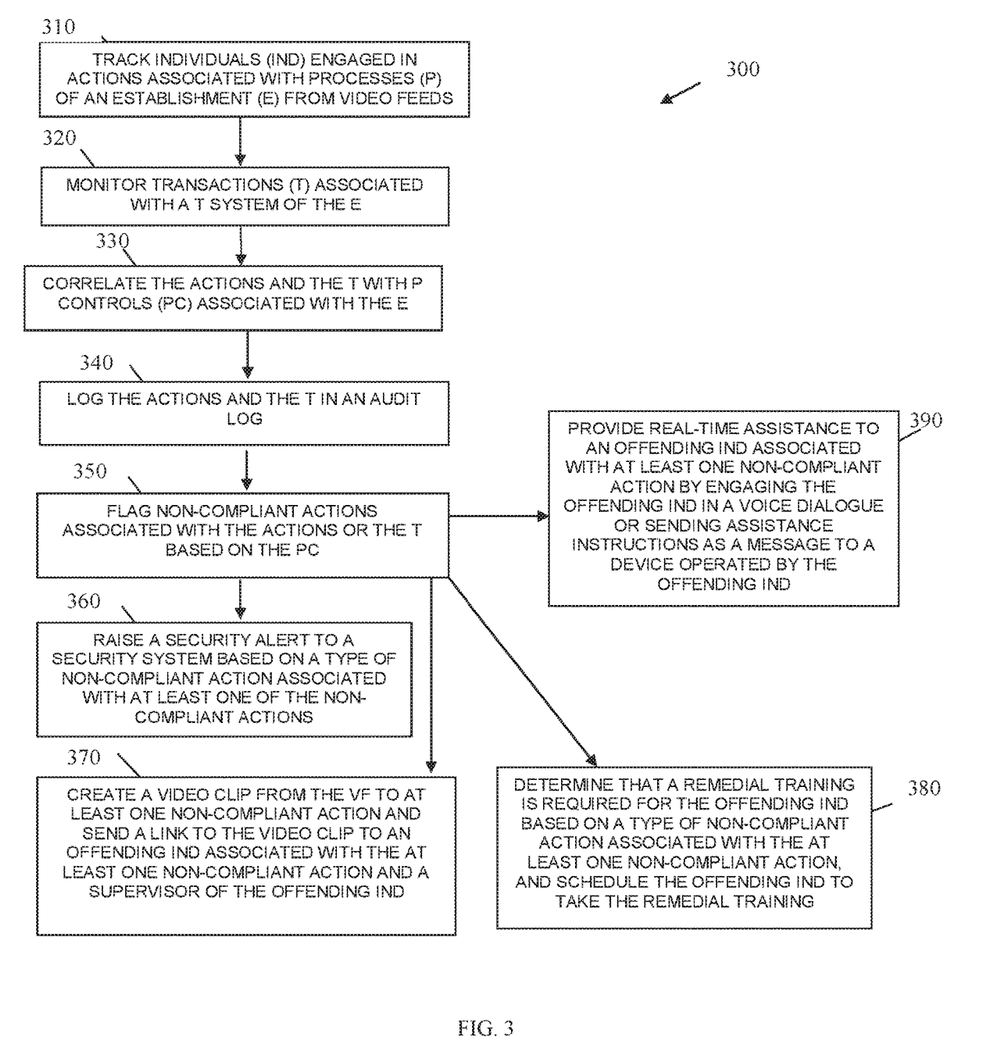
FIG. 3 is a diagram of another method for frictionless and autonomous control processing, according to an example embodiment.

FIG. 3 is a diagram of another method 300 for frictionless and autonomous control processing, according to an example embodiment. The software module(s) that implements the method 300 is referred to as an "autonomous process controller." The autonomous process controller is implemented as executable instructions programmed and residing within memory and/or a non-transitory computer-readable (processor-readable) storage medium and executed by one or more processors of a device. The processors that execute the autonomous process controller are specifically configured and programmed to process autonomous process controller. The autonomous process controller may have access to one or more network connections during its processing. The network connections can be wired, wireless, or a combination of wired and wireless.

In an embodiment, the device that executes the autonomous process controller is the server 120. In an embodiment, the server 120 is a cloud processing environment, a LAN server, or a WAN server.

In an embodiment, the autonomous process controller is all of or some combination of: person tracker 124, object tracker 125, behavior-action tracker 126, compliance monitor 127, remediation manager, and/or the method 300.

The autonomous process controller presents another and, in some ways, enhanced processing perspective of the method 200 discussed above.

At 310, the autonomous process controller tracks individuals engaged in actions associated with auditable processes of an establishment from video feeds.

At 320, the autonomous process controller monitors transactions associated with a transaction system of the establishment.

At 330, the autonomous process controller correlates the actions and the transactions with process controls associated with the establishment.

At 340, the autonomous process controller logs the actions and the transactions in an audit log.

At 350, the autonomous process controller flags non-compliant actions associated with the actions or the transactions based on the process controls.

In an embodiment, at 360, the autonomous process controller raises a security alert to a security system based on a type of non-compliant action associated with at least one of the non-compliant actions.

In an embodiment, at 370, the autonomous process controller creates a video clip from the video feeds to correlate to at least one non-compliant action and sends a link to the video clip to an offending individual associated with the at least one non-compliant action and a supervisor of the offending individual.

In an embodiment, at 380, the autonomous process controller determines that remedial training is required for an offending individual based on a type of non-compliant action associated with at least one non-compliant action and schedules the offending individual to take the remedial training.

In an embodiment, at 390, the autonomous process controller provides real-time assistance to an offending individual associated with at least one non-compliant action by engaging the offending individual in a voice dialogue or by sending assistance instructions as a message to a device operated by the offending individual.

Figure 4:
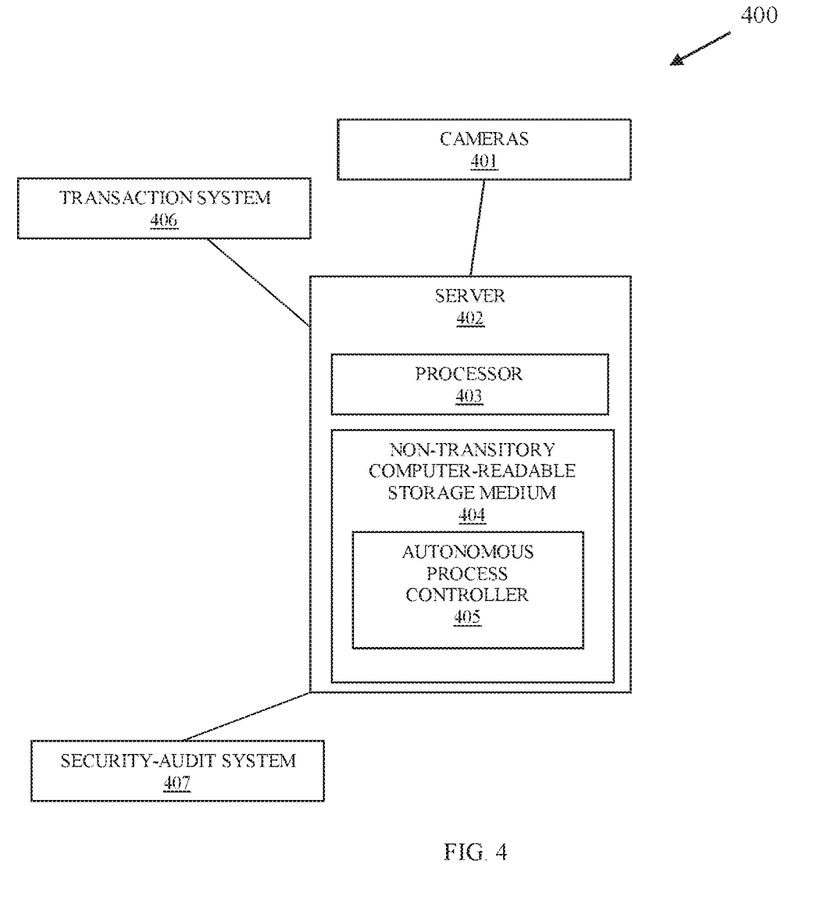
FIG. 4 is a diagram of another system for frictionless and autonomous control processing, according to an example embodiment.

FIG. 4 is a diagram of a system 400 for frictionless and autonomous control processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401, a server 402, a transaction system 406, and a security-audit system 407. The server 402 includes at least one hardware processor 403, a non-transitory computer-readable storage medium 404 having executable instructions representing an autonomous process controller 405.

The autonomous process controller 405 when executed from the non-transitory computer-readable storage medium 404 on the processor 403 is configured to cause the processor 403 to perform processing comprising: 1) tracking individuals engaged in actions and behaviors during establishment processes through the videos provided by the cameras 401; 2) monitoring transaction information associated with the transactions processed by the transaction system 406; 3) correlate the actions, behaviors, and transaction information of the transactions to the establishment processes based on process controls of the establishment; 4) logging the actions, behaviors, transaction information, and establishment processes in an audit log; 5) identifying non-compliant actions, non-compliant behaviors, and non-compliant transaction information based on the process controls, the establishment processes, the actions, the behaviors, and the transaction information; 6) providing real-time assistance to a particular individual based on a particular type of: non-compliant action, non-compliant behavior, or non-compliant transaction information associated with a first establishment process; 7) generating performance audit reviews of specific individuals from the audit log based on an event; 8) generating a video clip derived from the videos and a summary of the audit log for a second type of: non-compliant action, non-compliant behavior, or non-compliant transaction information associated with a second establishment process and sending the video clip and the summary to an offending individual and a supervisor of the offending individual; and 9) raising a security alert to a security-audit system 407 based on a third type of: non-compliant action, non-compliant behavior, or non-compliant transaction information associated with a third establishment process.

In an embodiment, the autonomous process controller 405 when executed from the non-transitory computer-readable storage medium 404 on the processor 403 is configured to further cause the processor 403 to perform additional processing comprising one or more of: 10) engaging the offending individual in a natural language voice dialogue to explain a specific non-compliant action or a specific non-compliant behavior performed by the offending individual relative to a specific establishment process; 11) engaging the offending individual in a second natural language voice dialogue to provide real-time assistance during a specific transaction associated with specific non-compliant transaction information.

In an embodiment, the autonomous process controller 405 is all of or some combination of: transaction process controller 123, person tracker 124, object tracker 125, behavior-action tracker 126, compliance monitor 127, remediation manager, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   detecting at least two devices associated with individuals within geofenced areas;
   tracking the individuals engaged in actions associated with processes of an establishment from video feeds using first identifiers associated with the individuals and second identifiers associated with the actions;
   monitoring transactions associated with a transaction system of the establishment based on transaction information provided by the transaction system;
   correlating the actions and the transactions with process controls associated with the establishment based on the first identifiers, the second identifiers, and the process controls that are identified based on predefined types associated with the transaction information and the second identifiers;
   logging the actions and the transactions in an audit log;
   flagging non-compliant actions associated with the actions or the transactions based on the process controls; and
   processing at least one automated action associated with conditions defined in the process controls.

2. The method of claim 1 further comprising raising a security alert to a security system based on a type of non-compliant action associated with at least one of the non-compliant actions.

3. The method of claim 1 further comprising creating a video clip from the video feeds to at least one non-compliant action and sending a link to the video clip to an offending individual associated with at least one non-compliant action and a supervisor of the offending individual.

4. The method of claim 1 further comprising, determining that a remedial training is required for an offending individual based on a type of non-compliant action associated with at least one non-compliant action, and schedule the offending individual to take the remedial training.

5. The method of claim 1 further comprising, providing real-time assistance to an offending individual associated with at least one non-compliant action by engaging the offending individual in a natural language dialogue or by sending assistance instructions as a message to a device operated by the offending individual.

6. A system, comprising:
- cameras configured to capture videos outside an establishment and inside the establishment;
- a transaction system configured to process transaction of the establishment;
- a server comprising a processor and a non-transitory computer-readable storage medium;
- the non-transitory computer-readable storage medium comprising executable instructions representing an autonomous process controller;
- the autonomous process controller when executed on the processor from the non-transitory computer-readable storage medium causing the processor to perform processing comprising:
  - detecting at least two devices associated with individuals within geofenced areas;
  - tracking the individuals engaged in actions and behaviors during establishment processes through the videos provided by the cameras based on first identifiers associated with the individuals, second identifiers associated with the actions, and third identifiers associated with the behaviors;
  - monitoring transaction information associated with the transactions processed by the transaction system;
  - correlate the actions, behaviors, and transaction information of the transactions to the establishment processes based on process controls of the establishment based on the first identifiers, the second identifiers, the third identifiers, and the process controls that are identified based on predefined types associated with the transaction information, the second identifiers, and the third identifiers;
  - logging the actions, behaviors, transaction information, and establishment processes in an audit log;
  - identifying non-compliant actions, non-compliant behaviors, and non-compliant transaction information based on conditions met while evaluating the process controls, the establishment processes, the actions, the behaviors, and the transaction information;
  - providing real-time assistance to a particular individual based on a particular type of:
- non-compliant action, non-compliant behavior, or non-compliant transaction information associated with a first establishment process;
  - generating performance audit reviews of specific individuals from the audit log based on an event;
  - generating a video clip derived from the videos and a summary of the audit log for a second type of:
- non-compliant action, non-compliant behavior, or non-compliant transaction information associated with a second establishment process and sending the video clip and the summary to an offending individual and a supervisor of the offending individual; and
  - raising a security alert to a security-audit system based on a third type of:
- non-compliant action, non-compliant behavior, or non-compliant transaction information associated with a third establishment process.

7. The system of claim 6, wherein the autonomous process controller when executed on the processor from the non-transitory computer-readable storage medium further causing the processor to perform additional processing comprising one or more of:
- engaging the offending individual in a natural language voice dialogue to explain a specific non-compliant action or a specific non-compliant behavior performed by the offending individual relative to a specific establishment process;
- engaging the offending individual in a second natural language voice dialogue to provide real-time assistance during a specific transaction associated with specific non-compliant transaction information.

\* \* \* \* \*